United States Patent [19]

Uraneck et al.

[11] 4,191,732

[45] Mar. 4, 1980

[54] METHOD OF REMOVING SULFUR DIOXIDE FROM GASES

[75] Inventors: Carl A. Uraneck; Paul H. Johnson, both of Bartlesville, Okla.

[73] Assignee: Phillips Petroleum Company, Bartlesville, Okla.

[21] Appl. No.: 851,647

[22] Filed: Nov. 15, 1977

[51] Int. Cl.² ............... C01B 17/00; B01D 19/00; B01D 39/00
[52] U.S. Cl. ............... 423/243; 423/532; 423/575; 423/539; 55/73
[58] Field of Search ............... 423/242, 243, 244, 575, 423/532, 539; 55/73

[56] References Cited

U.S. PATENT DOCUMENTS

| | | | |
|---|---|---|---|
| 2,215,754 | 9/1940 | Headlee | 423/243 |
| 2,368,545 | 1/1945 | Hooker et al. | 423/243 |
| 3,726,958 | 4/1973 | Holt | 423/243 |

Primary Examiner—O. R. Vertiz
Assistant Examiner—Gregory A. Heller

[57] ABSTRACT

Sulfur dioxide is removed from a sulfur dioxide-containing gas mixture by contacting the gas mixture with a monoolefin or diolefin.

11 Claims, 3 Drawing Figures

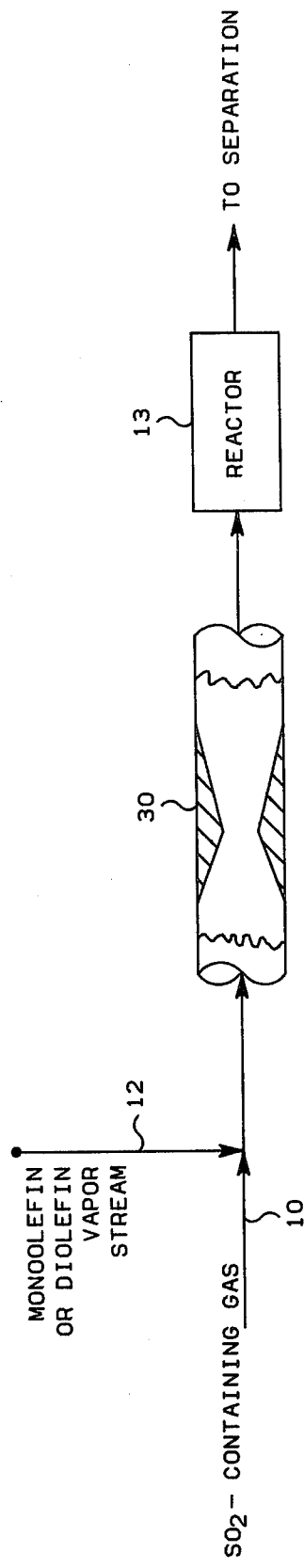
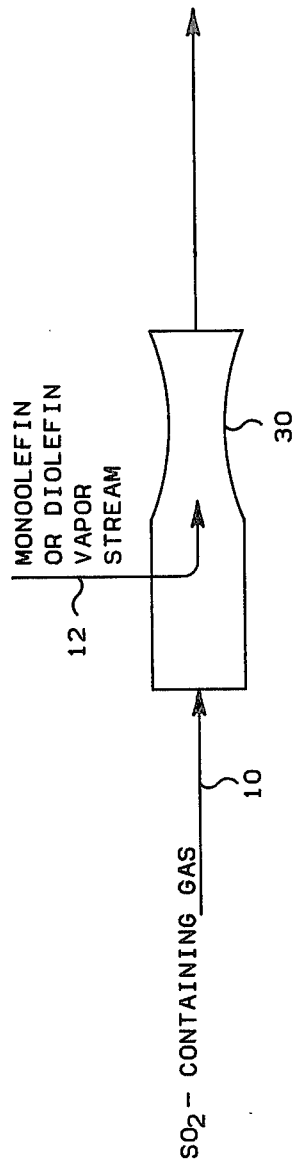

METHOD OF REMOVING SULFUR DIOXIDE FROM GASES

FIELD OF THE INVENTION

This invention relates to the removal of sulfur dioxide ($SO_2$) from a gaseous mixture.

BACKGROUND OF THE INVENTION

Sulfur dioxide is a common atmospheric pollutant. It is desirable to remove $SO_2$ from gaseous mixtures, such as flue gases, before such gaseous mixtures are released to the atmosphere.

The prior art has addressed this problem with various scrubbing devices. These solutions to the problem have had the drawback that they create a problem of disposal of the spent aqueous solutions which are used in scrubbers.

The present invention, on the other hand, provides a solution to the problem wherein scrubbing is not required. Besides the fact that it creates no new disposal problem, the present invention in one embodiment provides concentrated $SO_2$ as a product.

It is an object of this invention to remove sulfur dioxide from gaseous mixtures.

STATEMENT OF THE INVENTION

According to the invention, sulfur dioxide is removed from a gaseous mixture by contacting the mixture with a monoolefin or diolefin under conditions which result in the formation of a sulfone and/or an $SO_2$-containing copolymer.

DESCRIPTION OF THE DRAWINGS

FIG. 2 and FIG. 3 are diagrammatic illustrations of different systems that are suitable for mixing the $SO_2$-containing flue gas and the olefin or diolefin vapor prior to the reaction wherein the sulfone is produced.

PREFERRED EMBODIMENT OF THE INVENTION

Figure 1:
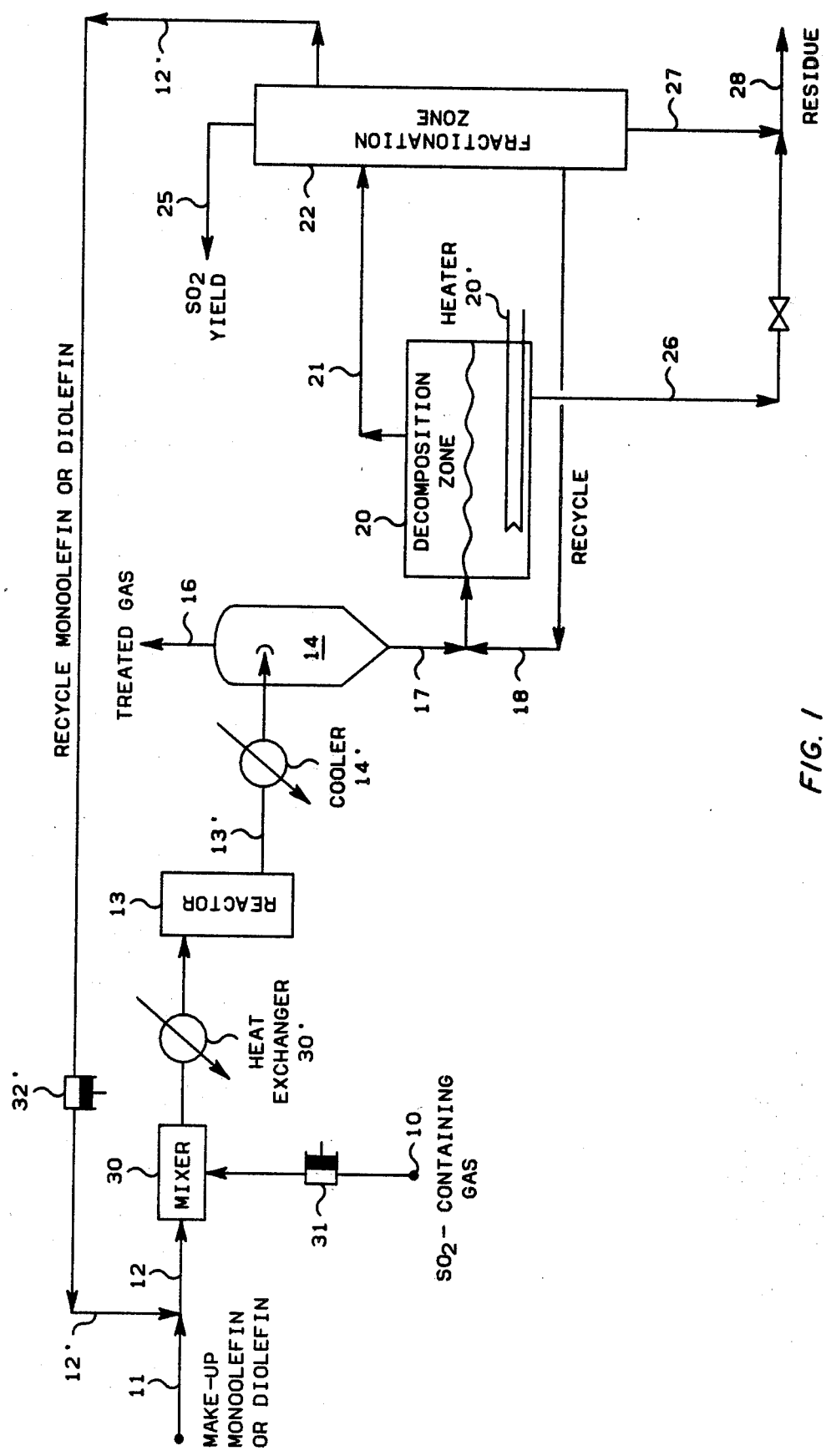
FIG. 1 is a diagrammatic illustration of an embodiment of the steps in the method according to the invention.

Referring to the drawing, in FIG. 1 a stream 10 comprising a gaseous mixture containing $SO_2$ is compressed by compressor 31 and charged, together with a monoolefin or diolefin stream 12 comprising make-up monoolefin or diolefin stream 11 and recycle monoolefin or diolefin stream 12', compressed by compressor 32', to a mixer 30. After the gases are admixed sufficiently, and at the desired temperature, as adjusted by heat exchanger means 30', and the desired pressure, they are charged to reactor 13, where they are retained and reacted for a suitable reaction time. The reaction products are discharged through conduit 13' and are cooled in cooler 14', after which they are charged to a vapor-solids separator 14. The treated flue gas, now substantially freed of sulfur dioxide, is removed through conduit 16; and the solid sulfone and/or $SO_2$-containing copolymers formed in the reaction, together with any excess cooled and liquefied monoolefins or diolefins (if present), are charged, via conduit 17, to zone 20 where the produced solid sulfone is decomposed by use of heating means 20'.

The gaseous decomposition products, $SO_2$ and olefins or diolefins, are removed as a vapor via conduit 21 and are then fractionally separated at fractionation zone 22, yielding $SO_2$ which is recovered at conduit 25 and olefin or diolefin which is recovered in monoolefin or diolefin stream 12'. The recycle monoolefin or diolefin stream 12' can be used in monoolefin or diolefin stream 12.

Any sulfone which escapes (entrained in vapors) from decomposition zone 20 via conduit 21 is recovered at fractionation zone 22 and can be recycled via conduit 18 to decomposition zone 20.

To prevent any heavy residue from building up and remaining in decomposition zone 20, a portion of the melt in decomposition zone 20 can be occasionally or continuously removed via conduit 26 and combined with any residue that builds up in fractionation zone 22 and removed via conduit 27; and this combined residue can be removed via conduit 28 and further processed, such as for example in a catalytic cracking system (not shown). The valve in conduit 26 is open when a portion of the melt is being removed from decomposition zone 20; and otherwise it is closed.

A gas containing any amount of $SO_2$ can be processed in the practice of this invention to decrease its content of $SO_2$. The invention is applicable to small concentrations of $SO_2$ but can be applied to a wide range of concentrations. The invention is also applicable to gaseous mixtures containing a wide variety of components. However, flue gases which contain $SO_2$, carbon dioxide, water vapor, and nitrogen are probably the most common gas mixture which will be treated according to the method of the present invention.

Any olefin or diolefin or suitable gas or vapor mixture thereof which forms $SO_2$-containing copolymers or sulfones can be used in the practice of the invention. Examples are isobutylene, butadiene, isoamylenes, bicyclo-[2,2,1]-hept-2-ene, xylylene, 1,3-cycloheptadiene, 1-vinyl cyclohexene, 1,1'-bicyclohexenyl, and homologues of the type

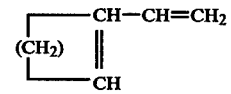

where n=3, 5, or 6. Isoprene is a preferred reactant because it is usually readily available.

It is now preferred not to use an excess of monoolefin or diolefin but rather to use less than the stoichiometric amount required to react with all of the $SO_2$. This is so because it is not necessary to remove $SO_2$ completely from vented flue gases, and the use of less than stoichiometric monoolefin or diolefin minimizes passage of unreacted monoolefin or diolefin out with the vented gas. Such vented monoolefin or diolefin would necessarily have to be removed from the gases, e.g., by cooling the gas sufficiently to condense the monoolefin or diolefin which is recovered as a liquid from the remaining gases.

It is not required nor desirable that a diluent be used in reactor 13.

The process used in the practice of the invention is preferably continuous.

Mixer 30 can be any suitable known gas-gas mixing means, such as a Venturi mixer. Such mixers are illustrated in FIG. 2 and FIG. 3. FIG. 2 shows admixing the $SO_2$-containing stream 10 and monoolefin or diolefin via stream 12 upstream of a Venturi mixer (mixing occurring in the diverging section). In FIG. 3 the $SO_2$- containing stream 10 is added to the eductor powered by isoprene vapor stream 12, with major mixing occurring in the diverging zone of the eductor.

The gas to be treated and the monoolefin or diolefin preferably are compressed so that the reaction in reactor 13 proceeds quickly. A compressor which compresses the gases to a pressure in the range from about 75 psig to about 150 psig is suitable.

Compressed flue gas and compressed monoolefin or diolefin can be mixed in mixer 30; or alternatively the mixture of flue gas and monoolefin or diolefin can be compressed after mixing has been done; but this latter alternative is not now preferred since solids undesirably can form in the compressor.

The mixture of compressed $SO_2$ and monoolefin or diolefin are then fed into reactor 13 preferably continuously; and the reaction product is continuously drawn off. However, it would also be within the scope of this invention to conduct the reaction in reactor 13 and other steps in the invention in batches.

The reactants should preferably remain in reactor 13 for an average length of time from about 5 minutes to about 50 minutes, depending upon the diolefin or monoolefin and upon the temperature and pressure used. Generally, a reaction time of about 15 minutes will be adequate. The reaction temperature will generally be within the range from about 40° to about 150° C. This temperature range can be effected by indirect heat exchange. The pressure in the reactor will generally lie in the range from about 75 psig to about 150 psig.

Reactor 13 should be of sufficient size in order to attain the desired reaction (or residence) time for the quantity of gases charged thereto.

A portion of the reaction mixture in reactor 13 is continuously drawn off, cooled by cooler 14', and charged to vapor-solids separator 14. This separator generally is operated within a pressure range from about 75 to about 150 psig and within a temperature range from about 15° to about 60° C. If excess monoolefin or diolefin is used in the reactor 13 or if some monoolefin or diolefin has not reacted, treated gas stream 16 should be chilled and the monoolefin or diolefin removed as a liquid. Therefore, vapor-solids separator 14 should contain some cooling means; or the stream 16 can be chilled and passed to a liquid removal vessel, not shown. Alternatively, an oil absorption step, not shown, can be used to remove unreacted monoolefin or diolefin from the treated gas 16 to be discharged to the atmosphere.

The treated gas will generally contain some small residual amount (such as about 0.01% by volume) of $SO_2$, depending upon whether excess monoolefin or diolefin was used and upon the reaction time which was allowed.

Any excess unreacted liquefied monoolefin or diolefin can be vaporized and sent, along with the solids formed, to decomposition zone 20, where the sulfone is decomposed to the olefin or diolefin and $SO_2$. Decomposition zone 20 will generally be operated at a temperature within the range from about 90° to about 160° C. and at a pressure within the range from about 75 to about 150 psig. The time allotted for decomposition will generally be about 5 to about 25 minutes.

Fractionation zone 22 will normally be operated (when isoprene is used as the diolefin) at a pressure within the range from about 15 to about 150 psig, at a top temperature within the range from about 130° to about 270° F., and at a bottom temperature within the range from about 140° to about 300° F. Operating conditions when other olefins or diolefins are used can be established by one skilled in the art of fractionation.

The recovered concentrated $SO_2$ can be used in any application known in the art. For example, it can be liquefied and used as a solvent for the recovery of aromatics from liquid hydrocarbons by liquid-liquid extraction, or it can be reacted to yield elemental sulfur or sulfur trioxide.

CALCULATED EMBODIMENT

An illustrative calculated embodiment is given in Table I, illustrating a typical run according to the invention, using isoprene. The example was calculated using less than the amount of isoprene required to completely react out all of the $SO_2$. It was assumed that the reaction was about 95% completed and the unreacted isoprene was in a sense occluded or "dissolved" into the solid sulfone. Also, it was assumed that some heavy polymeric material was formed.

Using the feed rates of the calculated specific example, a tank 25 feet in diameter by 50 feet high will be satisfactory for the desired residence time of 15 minutes.

Table I

Typical Operating Conditions

| (13) | Methylsulfolene Production | Ranges | For Calculated Specific Example |
|---|---|---|---|
| | Pressure, psig., | 75 to 150 | 100 |
| | Temperature, °C., | 40 to 150 | 70 |
| | Residence Time, Min., | 5 to 50 | 15 |
| | $SO_2$/Isoprene Mol Ratio, | 1:1 to 1:3 | 1.15 |
| (14) | Gas-Solids Separator: | | |
| | Pressure, psig., | 75 to 150 | 100 |
| | Temperature, °C., | 15 to 60 | 45 |
| (20) | Decomposition Zone: | | |
| | Pressure, psig., | 75 to 150 | 100 |
| | Temperature, °C., | 90 to 160 | 110 |
| | Residence Time, min., | 5 to 25 | 10 |
| (22) | Fractionation Zone: | | |
| | Pressure, psig., | 15 to 150 | 60 |
| | Top Temp., °F., | 130 to 270 | 199 |
| | Bot. Temp., °F., | 140 to 300 | 220 |
| | CALCULATED TYPICAL RUN | | |
| (10) | Flue Gas, SCF/Day, | | 12,200,000 |
| | Vol. % $SO_2$, | | 1.64 |
| | Vol. % $CO_2$, | | 20.60 |
| | Vol. % $N_2$, | | 77.76 |
| (12) | Isoprene, SCF/Day, Total, | | 190,000 |
| | (12') Recycle, SCF/Day, | | 180,000 |
| | (11) Makeup, SCF/Day, | | 10,000 |
| (16) | Flue Gas Yield, SCF/Day, | | 12,010,000 |
| | Vol. % $SO_2$ | | 0.08 |
| | Vol. % $CO_2$ | | 20.93 |
| | Vol. % $N_2$ | | 78.99 |
| (25) | $SO_2$ Yield, SCF/Day, | | 180,000 |
| (17) | Separator Underflow, Lbs/Day, | | 66,175 |
| (18) | Recycle From Fractionation Zone, Lbs/Day | | 8,400 |
| (28) | Residue, Lbs/Day | | 3,480 |

The numbers in Table I identifying the materials correspond to the places in FIG. 1 where the materials are found.

The calculated typical run demonstrates the reduction of the concentration of $SO_2$ in a flue gas mixture when the gas is reacted with a diolefin according to the present invention.

This invention is intended to cover reasonable changes and modifications in the above description.

What is claimed is:

1. A process for removing sulfur dioxide ($SO_2$) from an $SO_2$-containing gaseous stream comprising:
   (a) contacting a initial $SO_2$-containing gaseous stream and at least one suitable hydrocarbon comprising monoolefins, diolefins, and mixtures thereof so as to form an essentially $SO_2$-free gaseous stream and at least a first sulfur compound selected from the group consisting of sulfones, $SO_2$-containing copolymers and mixtures thereof
   (b) separating said first sulfur compound from said essentially $SO_2$-free gaseous stream;
   (c) thermally dissociating at least a portion of said first sulfur compound in a heating zone so as to generate a product mixture comprising $SO_2$ and said hydrocarbon;
   (d) separating said hydrocarbon and said $SO_2$ by fractionating said product mixture in a fractionation zone; and
   (e) recycling said hydrocarbon to the initial $SO_2$-containing gaseous stream.

2. A process according to claim 1 wherein said first sulfur compound is a solid when it is separated from said essentially $SO_2$-free gaseous stream.

3. A process according to claim 1 wherein the separated $SO_2$ is reacted under conditions so as to form at least one second sulfur compound selected from the group consisting of sulfur trioxide and elemental sulfur.

4. A process according to claim 3 wherein said $SO_2$ containing gaseous stream and said hydrocarbon are compressed prior to contact.

5. A process according to claim 4 wherein said process is continuous.

6. A process according to claim 5 wherein said hydrocarbon is isoprene.

7. A process according to claim 1 wherein the separated $SO_2$ is liquefied and used as a solvent for the recovery of aromatic hydrocarbons.

8. A process according to claim 7 wherein the amount of said hydrocarbon is slightly less than the stoichiometric amount which would be required to react with all the $SO_2$ in said $SO_2$-containing gaseous stream.

9. A process according to claim 1 wherein said hydrocarbon and said $SO_2$ are gaseous when they react to form said first sulfur compound.

10. A process according to claim 1 wherein a portion of the first sulfur compound is recovered in the fractionation zone and recycled to the heating zone.

11. A process according to claim 1 wherein the $SO_2$-containing gaseous stream is a flue gas stream.

* * * * *